United States Patent Office 3,254,106
Patented May 31, 1966

3,254,106
PREPARATION OF CARBOTHIOLIC ACIDS AND CORRESPONDING THIOLESTERS
John J. Godfrey, Silver Spring, Md., assignor to Chevron Research Company, a corporation of Delaware
No Drawing. Filed Mar. 8, 1963, Ser. No. 263,755
11 Claims. (Cl. 260—455)

This application is a continuation-in-part of my copending application Serial No. 843,044, filed September 29, 1959, now abandoned.

This invention relates to a process for the preparation of carbothiolic acids, and particularly to an improved process for the preparation of carbothiolic acids from carboxylic acid anhydrides.

Carbothiolic acids produced according to the present process are useful as chemical intermediates. For example, they may be added to olefins to produce thiolesters, which are useful as such, for example as plasticizers, and which also are useful as chemical intermediates. The thiolesters may be hydrolyzed to produce carboxylic acids and mercaptans, which are useful in the rubber field.

It is known that certain carbothiolic acids can be prepared from certain carboxylic acid anhydrides by reacting those anhydrides with hydrogen sulfide. For example, one mol of hydrogen sulfide may be added to one mole of acetic anhydride to produce one mole of acetic acid and one mole of thioacetic acid.

It is known that this reaction can be catalyzed with either acidic or basic catalysts. However, the prior art acid-catalyzed reaction, for example using hydrochloric acid, is generally unsatisfactory; reaction times and yields do not compare favorably with the prior art base-catalyzed reaction. The prior art base-catalyzed reaction is better from a reaction time and yield standpoint, but is subject to serious operating difficulties. The reaction heretofore has been generally carried out with such strong basic catalysts as sodium hydroxide, sodium hydrosulfide, and sodium acetate. The reaction in the presence of these catalysts proceeds rapidly and in good yield; however, the carbothiolic acid produced must be removed from the soluble basic catalysts rapidly and continuously in small amounts in order to prevent serious decomposition of the thioacetic acid; sodium hydroxide, for example, can remove sulfur from the thioacetic acid to form sodium acetate and sodium sulfide. This is a serious disadvantage for various reasons, one of which is the fact that the crude reaction mix cannot be used as such when adding the thioacetic product to an olefin to produce a thiolester, nor are these catalysts useful for continuous process use.

Further, strong caustic has a deleterious effect on glass and metals; sodium hydroxide, for example, is known to gradually destroy glass and to embrittle metals.

It has now been discovered that carbothiolic acids can be produced from carboxylic acid anhydrides in the liquid phase by a novel reaction system that completely avoids the foregoing operating difficulties that have confronted the prior art.

In accordance with the present invention, there is provided a process for producing carbothiolic acids from carboxylic acid anhydrides which comprises contacting in the liquid phase a stable carboxylic acid anhydride with hydrogen sulfide for a period of from 0.001 to 20 hours at a temperature of about from 0–100° C., and a hydrogen sulfide partial pressure of above about 1 atmosphere to about the $H_2S$ critical pressure, in the presence of a lower alkanoic acid leached synthetic, insoluble, cross-linked, basic, amino, anion-exchange resin to produce a reaction mixture comprising the corresponding carbothiolic acid and recovering from the reaction mixture the carbothiolic acid so produced. Further, in accordance with the present invention, instead of recovering the carbothiolic acid from the reaction mixture, the reaction mixture can be passed into contact with an olefin under free radical reaction conditions thereby yielding the corresponding thiolesters.

Synthetic basic amino nitrogenous anion exchange resins in general are suitable for use as catalysts in the process of the invention, provided that prior to use they are leached with an alkanoic acid. Suitable resins are substantially hydrocarbon polymers of at least 50,000 mole weight units of which at least about 0.1% of the polymer weights derives from a cross-linking agent. As much as 40% of the polymer weight and more may be cross-linked and the molecular weight may be $10^7$ mole weight units and higher. The catalytic effect of the leached resin derives in the main from the basic nitrogen content thereof. Thus, satisfactory resins must contain at least about 1% by weight of bound basic nitrogen. The balance of the resin is desirably and substantially a polymerized inert hydrocarbon backbone which may be as much as 99% of the bulk of the resin. Preferably, the basic nitrogen content varies in the range from about 2–20% by weight of the resin. Insoluble, infusible, cross-linked resins containing larger amounts of amino nitrogen than 50% by weight are difficult to prepare.

Synthetic basic nitrogenous anion exchange resins as contemplated in the present process are classified as (1) strongly basic resins, and (2) weakly basic resins. Strongly basic resins contain quaternary ammonium nitrogen. Weakly basic resins contain only primary, secondary, and tertiary basic amino nitrogen and mixtures thereof. Strongly basic quaternary ammonium hydroxide resins readily catalyze the formation of carbothiolic acids from carboxylic anhydrides and $H_2S$, but the crude product mixtures do not add to olefins. Both strongly and weakly basic amino resins which have been leached with an alkanoic acid catalyze the desired reaction and yield crude carbothiolic acid containing product mixtures of which the carbothiolic acids therein add to olefinic hydrocarbons. Catalysis by the weakly basic resins is preferred because the crude carbothiolic acid-containing reaction product mixtures therefrom in general readily add to olefins, usually upon the mixing thereof. On the other hand, carbothiolic acid-containing reaction product mixtures obtained by the use of alkanoic acid leached strongly basic resins while useful require in general substantially longer reaction times and stronger free radical reaction conditions: i.e., (1) 0–150° C., (2) added free radical catalysts such as strong light, organic peroxides, organic azo free radical precursor compounds or the equivalent free radical reaction initiator compounds, before carbothiolic acid addition to olefins occurs.

Weakly basic anion exchange resins as contemplated herein are further distinguishable from strongly basic resins in that the former are capable of very limited splitting of sodium chloride in the ion exchange sense, whereas the latter are very effective. In general, the preferred weakly basic solid, insoluble, anion exchange resins have pKa values less than about 7. The pKa values for analogous low molecular weight compounds are substantially the same as for the polymerized material. Thus, vinyl pyridines and a high molecular weight resin containing this basic monomer incorporated therein will have pKa values of about 5. Similarly, pKa values for other representative preferred weakly basic polymer functional units are:

| Basic unit: | pKa (aqueous solution, 25° C.) |
|---|---|
| Quinoline | 5 |
| Toluidine (o, m, p) | 4–5 |
| Aniline | 4 |
| Naphthylamine | 4 |
| N-methylaniline | 5 |
| N-methylpyrrolidine | 4 |
| Pyrrole | 0.4 |
| 2-amino-pyridine | 7 |

By lower alkanoic acid leaching is meant contacting the resin with a liquid organic mono-basic acid such as formic, acetic, propionic, and the like. For practical reasons, acetic acid is preferred.

Solid, fresh, basic anion exchange resins vary greatly depending upon how they were prepared and can be in a variety of chemical conditions in what is called the chloride, carbonate, hydroxide, and the like, form. Whatever the form, leaching with the alkanoic acid is continued until for all practical purposes all extractable content of the resin is removed therefrom. Thus, for most resins a simple test of the wash effluent showing it to be substantially free of the chloride, water, $CO_2$, or the like is sufficient. Initially and especially for dry resins, some water may be present in the leaching acid. Upon being contacted with liquids, most resins swell to some extent. Some water in the organic acid frequently expedites the swelling process. After the swelling is substantially completed, several subsequent washes with a substantially anhydrous acid, such as acetic, usually suffice to condition to resin for satisfactory performance as a catalyst in the present process. Upon draining off the last acid wash, the organic acid pregnant resin is ready for use as a catalyst. Representative synthetic basic nitrogenous anion exchange resins, suitable for use in the preparation of suitable catalysts in the process of the invention, are known in the art. Many are available commercially. Typical anion exchange resins, and methods for their preparation, are well known in the art and include such specific resins as:

(1) Copolymerized styrene-divinylbenzene (o, m, p, or mixtures) backbone-hydrocarbon polymer into which amino nitrogen is chemically incorporated by (1) chloromethylation and amination with any of the group ammonia, methyl amine, dimethylamine, and/or quaternized by alkyl halide reaction, or (2) alkylated by Friedel-Crafts reaction with polyhalogenated alkanes followed by amination as in (1); or (3) nitration with nitric acid followed by reduction, for example, with tin salts and the like.

(2) Copolymerized basic nitrogen containing vinylmonomers such as 2,3- or 4-vinylpyridine, divinylbenzene (o, m, p or mixtures) of divinylpyridines, the resulting polymers being used per se (weakly basic resins) or quaternized (strongly basic resins).

(3) Phenol, aldehyde, plus primary or secondary alkylamine, or polyamine resins.

(4) Phenylene diamine-formaldehyde (alkaldehyde) resins.

(5) Polyethlene amine, 1,2-dichlorooctane, formaldehyde resins.

(6) Ammonia-epichlorohydrin-polyvinyl imidazol resins blended with poly-N-vinyl-imidazol.

(7) Resins of cross-linked vinyl aromatic polymers reacted with haloalkylimides.

Preferably, the resins are polyvinyl resins such as those obtained by the copolymerization of an monovinyl monomer, preferably a vinyl aryl compound or vinyl-substituted aromatic heterocyclic compound of carbon and nitrogen, with a divinyl compound, a cross-linking agent, preferably a divinyl aryl compound or a divinyl substituted aromatic carbon-nitrogen-heterocycle which either contain amino nitrogen by reason of the monomer used or have incorporated thereinto amino nitrogen by known chemical reactions.

Representative preferred resins are those prepared using monovinyl monomers, such as styrene, α-methylstyrene, α-vinylnaphthalene, β-vinylnaphthalene, vinyltoluene, vinylxylene, vinylethylbenzenes, vinylchlorobenzenes, vinylamino benzene, vinylpyridine, vinylisoquinolines, vinylquinolines, 2-methyl-5-vinyl quinoline, 4-methyl-4-vinyl quinoline, 1-methyl-5-vinyl isoquinoline, 3-methyl-5-vinyl pyridine 2,3-dimethyl-5-vinyl pyridine, 2-methyl-3-ethyl-5-vinyl pyridine, and representative preferred divinyl cross-linked monomers, such as divinyl benzenes (o, m, p), divinyl toluenes, divinyl xylenes, divinyl ethylbenzene, divinyl chlorobenzenes, divinyl naphthalene (all), divinylpyridines (2,5; 3,6; etc.), divinyl quinolines, as well as divinyl isoquinolines.

In general, all known synthetic cross-linked, infusible, insoluble basic amino anion-exchange resins are contemplated for use as catalysts in the organic alkanoic acid leached form in the present process.

Desirably, the resin solubility of the reaction medium will be less than 1 part per 100,000 parts by weight; preferably less than 1 part per $10^6$ parts of the medium.

Weakly basic resins having pKa values less than about 7 are particularly contemplated.

The solid resins used as catalysts in the process of the present invention are usually supplied in granular or bead form and can be used for catalyst preparation in this form, or the resins can be further ground or crushed to provide more finely divided solid material, if desired. In continuous embodiments of the process wherein the leached catalyst solid is retained in a reaction zone while reactants and reaction mixture are passed therethrough, coarse particles, granules or beads are usually preferred. In batch processes, finely divided leached resin solids are usually preferred for ease of suspension thereof in the liquid reaction mixture.

Where batch procedure is practiced, the catalyst is employed in an effective proportion usually between about 0.5 and about 75, preferably between about 10 and 50, percent by weight of the reaction mixture, although larger proportions can be used. For such procedures, the catalyst is preferably finely divided and well dispersed through the reaction mixture.

The solid insoluble synthetic resin catalyst can readily be separated from the liquid reaction mixture by usual means such as by filtering, by centrifuging, or by decanting the liquid from the solid. The solid so separated is suitable for reuse in the process.

A preferred manner of continuous operation is one in which the solid, particulate, resin catalyst is retained in a confined reaction zone and the reactants are caused to flow, either countercurrently or concurrently, through the reaction zone and over the solid catalyst. For this purpose, resins in the form of coarse granules or beads are preferred and are retained in a reaction zone by means of screens, perforated plates or the like, which are permeable to fluids. From such reaction zone the liquid reaction mixture can be obtained substantially free from the catalyst material.

In general, stable organic carboxylic acid anhydrides having melting points below 100° C. or which are appreciably (about 1% and higher) soluble below 100° C. in an inert diluent such as an alkane, alkane mixtures, benzene, chlorobenzenes, ethers, bromobenzenes, and the like, are contemplated as feeds in the process for the production of the corresponding carbothiolic acid. By stable is meant organic acids free of substituents known to be chemically reactive toward hydrogen sulfide, such as olefinic and acetylenic unsaturation, and substituent groups, such as nitrile, isocyanate, acid chloride, amide, and the like.

Representative stable organic acid anhydrides are acetic anhydride, propionic anhydride, butyric anhydride, benzoic anhydride, phthalic anhydride, succinic anhydride, valeric anhydride, o-toluic anhydride, stearic anhydride, octanoic anhydride, lauric anhydride, caproic anhydride, t-butylbenzoic anhydride, and the like. Alkanoic acid anhydrides are preferred.

Representative olefinic hydrocarbons useful for the production of the corresponding thiolesters by the direct addition of the crude reaction product mixture containing carbothiolic acid thereto are alkenes, cycloalkenes, and aryl substituted alkenes. Diolefins can also be used, preferably unconjugated $\alpha-\omega$ diolefins which yield the corresponding $\alpha,\omega$-thiolesters. 1-alkenes such as those obtained from wax cracking are particularly preferred olefin feeds for thiolester production and can include individual as well as mixtures of $C_6-C_{20}$ n-alkenes. Thiolesters of internal n-alkenes are also readily prepared using the crude reaction product mixture of the present process. Inertly substituted alkenes can also be used. Substituents such as halogen, —$CO_2CH_3$, —$CO_2H$, —$OH$, —O-alkoxy, and the like, may be present in place of one or more, but preferably not more than 2 of the hydrogen atoms of the alkene. An important aspect of the suitability of alkenes in general is their availability for liquid phase reaction below thermal dissociation temperatures of the desired carbothiolic acid, usually at reaction temperatures below 150° C.

Reaction times in the range .001–20 hours and higher are contemplated.

The following examples will serve to further illustrate the process of the present invention.

Example I

A solid resin catalyst was prepared by accomplishing an aqueous emulsion copolymerization of 2-vinyl pyridine and m-divinyl benzene. The polymerization was run under nitrogen at 54–60° C. with rapid stirring and intermittent cooling to control the mild exotherm. After one hour the temperature was raised to 76° C. and held there for one hour. The solid polymer granules were separated from the reaction mixture by filtration. A portion of the solid (A) was washed and dried. The balance (B) was washed (leached) in a 50% acetic acid-water mixture, and after separation from the wash solution followed by several washings with small portions of glacial acetic acid, and was ready for use as a catalyst.

Example II

Two grams of dry resin, solid (A) above, were added to 1.5 gram-moles of acetic anhydride in an autoclave which was then charged to about 1.4 atmospheres pressure of hydrogen sulfide. From room temperature (~22° C.) up to about 90° C. no appreciable reaction occurred. Above 90° C. some reaction appeared to take place, but reaction temperatures above about 100° C. are unsatisfactory because at these temperatures carbothiolic acids are known to decompose. The high temperature reaction products are highly discolored and unsatisfactory.

Example III

Catalyst (B) prepared as in Example I was used in the cleavage of acetic anhydride to produce thioacetic acid and acetic acid. The cleavage was accomplished in a low pressure reaction zone operable in the 1–5.1 atmosphere range. 153 g. (1.5 moles) of 97% minimum purity acetic anhydride and 100 g. of the catalyst were charged to the reaction zone. The reaction zone was then pressured to 5.1 atmospheres with hydrogen sulfide at room temperature. The temperature increased rapidly as hydrogen sulfide was absorbed and the reaction zone was repressed to 5.1 atmospheres several times until the uptake of hydrogen sulfide stopped. The reaction zone was cooled to room temperature and vented. A light yellow reaction product, largely comprising thioacetic acid and acetic acid, was decanted from the granular catalyst. The catalyst was swelled by products, but did not dissolve and therefore decantation was possible.

Example IV

A conventional reaction mixture of the composition essentially as obtained in Example II of U.S. Patent 2,412,036 was contacted with an aliquot of 1-octene at room temperature (~22° C.). No addition of thioacetic acid to the olefin occurred. After about ½ hour, the mixture was heated to 85° C. and maintained at this temperature for 2 hours. The reaction mixture darkened badly and no detectable thioester was produced.

Example V

Into an autoclave were placed 100 g. of acetic acid leached polyvinyl pyridine catalyst prepared as in Example (B) and 153 g. (1.46 moles) of 97% minimum purity acetic anhydride. The autoclave was then charged with hydrogen sulfide at pressures maintained in the range 2.7–4.4 atmospheres. Optimum reaction temperatures at these pressures appeared to be in the 30–40° C. range. Reaction was rapid. In this manner three batches or charges were converted to product requiring about 2 hours reaction time. After each charge had been converted to product, the liquid product mixture was drained from the autoclave prior to recharging. The drained crude product mixtures were each added to 252.5 g. aliquots of n-1-dodecene. No free radical catalyst was added, but initiation of the addition of the thioacetic acid to the olefin appeared to be immediate. Within 5 minutes the reaction temperature of the three batches had increased rapidly and varied at the maximum from 76–107° C. The yield of recovered n-dodecyl thiolacetate was 74% of theory, boiling point 149° C., at 5 mm. Hg, $N_D^{22.5}$ 1.4642.

Example VI

As in Example V, 66 g. of a moist quaternary amine hydroxide resin (Biorad AG–1–X8), a polystyrene cross-linked insoluble basic amine resin, and 102 g. of C.P. acetic anhydride were charged to an autoclave. Hydrogen sulfide was charged into the reaction zone up to a pressure of 4.1 atmospheres. A rapid reaction took place. The product was colored dark brown and contained thioacetic acid and acetic acid in the mole ratio 42:63, respectively.

An aliquot of the crude reaction product mixture was mixed with 1-octene. No addition reaction took place. The mixture was then irradiated by placing a 275-watt General Electric sun lamp at a point 15 cm. from the reaction mixture. Even after about two hours irradiation, no detectable thioester was produced.

Example VII

A second 66 g. portion of the quaternary amine hydroxide resin of Example VI was leached with a 50–50 mixture of water-acetic acid followed by several washes with acetic acid. The acetic acid wet resin was charged to an autoclave together with 102 g. of C.P. acetic anhydride. As the reactor was charged with hydrogen sulfide to a pressure of about 4 atmospheres, a very rapid reaction ensued. It was complete within about 15 minutes. The reaction product mixture was yellow-brown colored.

To a 41 g. aliquot of the product mixture was added 41 ml. of 1-octene and the resulting mixture stirred. After 25 minutes no reaction had taken place. The mixture was then heated, 50–80° C. for another 20 minutes. There was no detectable addition product.

As in Example VI, the mixture was irradiated strongly with a 275-watt lamp placed a distance of about 150 cm. and at a temperature of 40° C.; no addition was noted.

The lamp was then moved to a distance of about 15 cm. Reaction commenced and after 70 minutes was completed, yielding a water-white reaction product mixture.

*Example VIII*

A catalyst prepared as in Example I(B) was used in the cleavage of n-butyric anhydride to produce thiobutyric acid and butyric acid. The cleavage was accomplished using the same procedure as in Example III, except that following decantation of the reaction product, largely comprising thiobutyric acid and butyric acid, from the catalyst, the drained catalyst was successively contacted with two additional fresh one mole charges of n-butyric anhydride without the addition of any further quantity of catalyst. With the addition of each of these fresh charges, the reaction proceeded as readily as in the case of the first charge, upon repressuring the reaction zone with $H_2S$.

*Example IX*

The product from the third run of Example VIII was contacted with 1-octene in the manner described in Example V to form n-octyl thiobutyrate. The crude reaction product was then dissolved in ethyl ether, extracted several times with an aqueous sodium bicarbonate solution to remove butyric acid. The ether solution was then dried using anhydrous potassium carbonate. The n-octyl thiobutyrate product, recovered by a reduced pressure distillation, was water-white in color, had a boiling point range of 120–125° C. at 5 mm. of mercury pressure and had an index of refraction, $N_D^{20}$, of 1.4640. The yield was 86 percent of theory based on the butyric anhydride.

*Example X* n-Octyl thiolbenzoate was prepared from benzoic anhydride and 1-octene in the manner described in Example V, except that the temperature of the cleavage reaction was increased to 50° C. (melting point of benzoic anhydride 42° C.). Two runs were made with the same catalyst charge. The product of the second run was used to prepare the n-octyl thiolbenzoate product, which was recovered in a 60% of theory yield, and which was found to have a boiling point range of 150–160° C. at 2 mm. of mercury pressure.

From the foregoing it may be seen that (1) carbothiolic acids may be prepared in high yields by contacting organic carboxylic anhydrides with hydrogen sulfide in the presence of insoluble, cross-linked, basic amino anion-exchange resins which have been leached with a lower alkanoic acid, such as acetic acid, (2) the crude reaction product mixtures thus obtained can be directly used for free-radical type reactions, such as the addition of the carbothiolic acid contained therein to olefinic hydrocarbons, as well as substituted olefinic hydrocarbons, the substitutents being chemically inert toward carbothiolic groups, (3) the unleached basic amino resins are either essentially non-catalytic, i.e., the weakly basic resins, or catalytic for the cleavage reaction of the process, i.e., the strongly basic quaternary amino resins, but yield reaction product mixtures which are unsatisfactory for direct free-radical type reaction usages, (4) the leached solid cross-linked basic amino anion-exchange catalysts which are weakly basic, such as the polyvinylpyridine type and including similar resins having pKa values in general below about 7, are especially desirable catalysts for the process, yielding reaction product mixtures directly useful for free-radical type reactions, (5) the solid catalyst particles are swelled by product but do not dissolve because of their cross-linked structure, and therefore can be separated easily from the reaction mixture, (6) addition of fresh anhydride and hydrogen sulfide can result in successive batches of product with no appreciable lessening of catalytic activity and no appreciable deterioration in physical properties of the catalyst, (7) the crude reaction mix can be contacted as such with an olefin to form a thiolester by the reaction of the olefin with the thioacid in the reaction mix, thus avoiding process cost and loss of product by decomposition during purification by distillation.

I claim:

1. In the process for the preparation in the liquid phase of carbothiolic acids from stable organic carboxylic acid anhydrides free of substituents chemically reactive toward hydrogen sulfide selected from the group consisting of said anhydrides having a melting point below about 100° C. and said anhydrides having at least a one weight percent solubility in an inert solvent below about 100° C., which is effected by contacting, at a temperature in the range from about 0–100° C. for a period of from 0.001 to 20 hours, said anhydride with hydrogen sulfide at a partial pressure in the range from about one atmosphere up to about the hydrogen sulfide critical pressure in the presence of a catalyst selected from the group consisting of strong basic and strong acidic catalysts, the improvement which comprises substituting for said catalysts a lower-alkanoic-acid-leached, synthetic, insoluble, cross-linked, basic-amino, anion-exchange resin, said resin being present in an effective proportionate component amount of the contact mixture and recovering the resulting contacted mixture.

2. Process of claim 1 wherein at least 0.5 weight percent of the total contact mixture is said resin.

3. Process of claim 1 wherein said leached synthetic basic resin catalyst has a pKa less than about 7.

4. Process of claim 1 wherein said reaction product mixture is contacted with an olefinic hydrocarbon in the liquid phase under free radical reaction conditions at a temperature below 150° C. for a period of from 0.1 to 10 hours and the corresponding thiolester is recovered.

5. The process of claim 1 wherein said resin is a quaternary ammonium resin.

6. Process for the production of alkanoic carbothiolic acids which comprises contacting in the liquid phase at a temperature of from about 0 to 100° C. for a period of from 0.001 to 20 hours, an organic alkanoic acid anhydride free of substituents chemically reactive toward hydrogen sulfide selected from the group consisting of said anhydrides having a melting point below about 100° C. and said anhydrides having at least a one weight percent solubility in an inert solvent below about 100° C. with hydrogen sulfide in the presence of a lower-alkanoic-acid-leached, synthetic, insoluble, cross-linked, basic-amino, anion-exchange resin, said resin being present to the extent of at least about 0.5 percent by weight of the total contact mixture, said hydrogen sulfide being at a partial pressure in the range from about one atmosphere up to about the hydrogen sulfide critical pressure.

7. The process of claim 6 wherein said leached synthetic basic resin catalyst has a pKa less than about 7.

8. Process of claim 6 wherein said reaction product mixture is contacted with an olefinic hydrocarbon in the liquid phase under free radical reaction conditions at a temperature below 150° C. for a period of from 0.1 to 10 hours and the corresponding thiolester is recovered.

9. Process for the production of thiolacetic acid which comprises contacting in the liquid phase at a temperature of from about 0 to 100° C. for a period of from 0.001 to 20 hours, acetic anhydride with hydrogen sulfide in the presence of at least 0.5 percent by weight of the total contact mixture of a lower-alkanoic-acid-leached, synthetic, insoluble, cross-linked, basic-amino, anion-exchange resin, said hydrogen sulfide being at a partial pressure in the range from about one atmosphere up to about the hydrogen sulfide critical pressure.

10. Process of claim 9 wherein said leached synthetic basic resin catalyst has a pKa less than about 7.

11. Process of claim 9 wherein said reaction product mixture is contacted with an olefinic hydrocarbon in the liquid phase under free radical reaction conditions at a temperature below 150° C. for a period of from 0.1 to 10 hours and the corresponding thiolester is recovered.

References Cited by the Examiner

UNITED STATES PATENTS

| | | | |
|---|---|---|---|
| 2,412,036 | 12/1946 | Ellingboe | 260—500 |
| 2,591,573 | 4/1952 | McBurney | 260—88.1 |

OTHER REFERENCES

Chemical and Engineering News, Feb. 21, 1949, page 557.

Reid, Organic Chemistry of Bivalent Sulfur, vol. IV, page 13 (1962), Chemical Pub. Co., New York, N.Y.

Rodd, "Chemistry of Carbon Compounds," volume I, Part A (1951), p. 595.

CHARLES B. PARKER, *Primary Examiner.*

DANIEL D. HORWITZ, *Examiner.*